United States Patent [19]
Powers

[11] Patent Number: 5,123,439
[45] Date of Patent: Jun. 23, 1992

[54] VALVE BODY CERAMIC LINERS

[75] Inventor: Kelly B. Powers, Salt Lake City, Utah

[73] Assignee: Industrial Ceramics Engineering, Salt Lake City, Utah

[21] Appl. No.: 637,365

[22] Filed: Jan. 4, 1991

Related U.S. Application Data

[63] Continuation-in-part of Ser. No. 473,334, Feb. 1, 1990, abandoned.

[51] Int. Cl.⁵ .......................... F16L 7/00; F16L 55/18
[52] U.S. Cl. .................................. 137/375; 137/15; 251/368
[58] Field of Search .................. 137/375, 15; 251/368, 251/331

[56] References Cited

U.S. PATENT DOCUMENTS

| | | | |
|---|---|---|---|
| 3,148,861 | 9/1964 | McFarland, Jr. | 251/368 |
| 3,340,795 | 10/1967 | Matsutani | 137/375 |
| 4,079,747 | 3/1978 | Roberts | 137/375 |
| 4,292,993 | 10/1981 | Felthuis et al. | 251/368 |
| 4,596,268 | 6/1986 | Jonas | 137/375 |
| 4,728,078 | 3/1988 | Oda et al. | 251/368 |
| 4,771,803 | 9/1988 | Berchem et al. | 251/368 |
| 4,791,953 | 12/1988 | Berchem | 251/368 |

Primary Examiner—A. Michael Chambers
Attorney, Agent, or Firm—James L. Sonntag

[57] ABSTRACT

Valves having a straight bore are fitted with a structurally discrete cylindrical ceramic liners. An additional ceramic insert may be inserted in the interior of the bonnet. The ceramic liner and ceramic insert protect the interior of the valve from abrasive and corrosive fluids flowing through the valve.

33 Claims, 8 Drawing Sheets

//VALVE BODY CERAMIC LINERS

RELATED APPLICATIONS

This application is a continuation-in-part of U.S. Pat. application, Ser. No. 07/473,334, filed Feb. 1, 1990 now abandoned.

FIELD OF THE INVENTION

This invention relates to valve bodies, particularly metal valve bodies, having a ceramic liner.

BACKGROUND OF THE INVENTION

Corrosive liquids, such as strong acids and bases, and highly reactive chemical solutions, are frequently used in chemical processes. Liquids may also be erosive, due to, for example, suspended solids in the liquid. Valves are a particularly vulnerable to both corrosive and erosive environments due to the necessity or maintaining the integrity of the fluid seal and the mechanical parts of the valve. Valves have frequently been lined with various types of materials such as rubber, glass, plastic and the like to combat either a corrosive or erosive environment. For example, to provide corrosion resistance iron valves may be lined with glass, or various rubbers such as butyl rubber, hard rubber, natural rubber, neoprene and the like. For erosion resistance, iron valves may be lined with hardened steel, or the like. Also, valves may be lined with various kinds of plastics, such as TEFLON TM and fiberglass-reinforced plastic. Lead has also been used to line valves, and many valves are coated with a thin layer of glass, which is generally applied in the form of low-temperature melting frit and then heated to form the glass lining in place.

While many lining materials are suitable for corrosive or erosive environments, most are not suitable for environments which are both erosive and corrosive, such as liquid acids containing abrasive solids. Metal valves lined with rubber, glass, lead and the like are commercially used in environments which are both corrosive and erosive, but the lifetime of these valves is relatively short in these environments, particularly where the fluid stream is moving at high velocities. None of these lining materials have a long life in handling a high-velocity, corrosive, and erosive liquids.

Ceramics are generally known for both corrosion and erosion resistance. Valves made of a ceramic material, however, can be difficult to form and consequently are relatively expensive. Furthermore, while ceramic devices can be corrosion and erosion resistant, they generally possess poor flexural stress resistance and impact toughness, so that a valve formed completely of ceramic could be easily fractured.

U.S. Pat. No. 3,349,795 to Matsutani discloses a diaphragm valve with a complex ceramic valve casing. The ceramic valve casing is a complex shape with an arcuate top surface formed across the fluid path to form a weir curving downwards to a circular opening. The complex shape of Matsutani ceramic casing limits the process of manufacture for the shape mostly to slip casting methods. Such a complex shape is not conducive to fabrication from high-purity, high density ceramics materials, which on a commercial scale require fabrication by powder compaction methods, particular isostatic and uniaxial compaction methods. In addition, common machining methods, such as lathe, mill, and cylindrical grinding, and surface grinding, cannot be used to form the shape. The ceramic materials which can be made into the shape of a Matsutani casing by slip casting methods are usually of a porcelain variety and typically of low purity, and do not have the corrosion resistance, particularly to highly caustic solutions, for many environments. In addition, the complex shape of the Matsutani ceramic casing requires a specially constructed two-piece valve body in order to insert the casing into the body.

An additional problem with complex ceramic shapes, such as in the Matsutani reference, is that flexural stresses are inevitably induced in the ceramic shape which cause these shapes to be quite fragile. In addition, such one piece complex shape is subject to thermal flexural stresses due the differing thermal expansion coefficients of the ceramic and the metal of the valve material.

OBJECTS OF THE INVENTION

It is, therefore, an object of the invention to provide a valve which is resistant to both erosive and corrosive liquids.

It is further an object of the invention to provide a valve with surfaces exposed to fluids being of a ceramic material, but without the poor structural integrity of valves constructed entirely of ceramic.

It is further an object of the invention to provide a ceramic valve liner which is not subject to mechanical and thermal flexural stresses within the valve liner.

It is further an object of the invention to provide a ceramic valve liner with a shape which can me made using common fabrication methods, i.e. mill, lathe, cylindrical grinding, and surface grinding, which are intrinsically relatively low cost ceramic processes.

Further objects of the invention will become evident in the description below.

SUMMARY OF THE INVENTION

An embodiment of the invention is a ceramic lined valve comprising:

(a) a non-ceramic valve body having a substantially straight bore with the bore axis extending along the main axis of the valve body, and having a bonnet containing a bore closed actuator means attached to a bore closure means, which closure means can be actuated by the actuator means to advance the closure means into the bore through a bonnet opening extending into the bore from the bonnet; and (b) a ceramic liner positioned within the bore and coextensive with at least a portion of the inner surface of the valve body in the bore to substantially prevent exposure of said inner surface to fluids within the bore, said liner being cylindrical with a hollow interior and having a longitudinal axis substantially corresponding with the axis of the bore, said liner having a sidewall opening sized and positioned relative to the bonnet opening so as to accommodate advancement of said bore closure means into the interior of the ceramic liner.

The non-ceramic valve bodies are those valve bodies known in the art which are so-called "straightway" diaphragm valves, i.e. having a substantially straight bore, with the axis of the bore extending along the main axis of the valve body. Typical of such valves are straightway diaphragm valves, which are generally are made of a metal, for example, cast iron, and have a valve body which has a straight-line, flow-through cylindrical bore.

A metal bonnet is attached generally by way of a flange to the valve body at right angles. The bonnet houses a bore closure actuator means, typically in the form of a screw-actuated compressor member, which extends and retracts a bore closure means, which is usually a flexible rubber-like diaphragm fixed to the compressor member. The diaphragm is fixed to the valve bonnet or valve body at its periphery to form a seal which prevents liquids or fluids within the central bore from invading the interior of the valve bonnet. By operation of the compressor member the diaphragm is advanced through the bonnet opening into the bore to provide a fluid seal for fluid flowing through the bore.

A ceramic liner is positioned within the bore, coextensive with or covering at least a portion of the inner surface of the valve body in the bore. The purpose of the ceramic liner is to protect the covered surface from the corrosive and/or erosive effects of exposure to the fluid flowing through the valve, by preventing substantial exposure the surface to the fluids.

The liner is cylindrical with a hollow interior. By cylindrical is meant the shape formed by a closed curved line in a plane moved along an axis not in the plane. The surface of the cylindrical shape can also be described as the surface traced by a straight line moving parallel to a fixed straight axis line and intersecting a fixed closed curve. Preferably the ends of the liner are perpendicular to the cylinder axis to form a right cylinder. The cross-section of the cylinder may be circular, or non-circular. Non-circular shapes may be preferred, for example, to accommodate certain closure means, and include generally ellipsoid or oval shapes, as well as complex curves, such as the "D" shape more fully explained below.

When placed within the valve body, the axis of the liner is preferably substantially aligned with the axis of the bore to provide a straight flow path similar to a valve body without a valve liner. If a standard manufactured valve body is to be fitted with a liner, the bore of the valve body is preferably machined to a larger bore cross-sectional area, and the cross-sectional area of the liner sized similar to the original bore. Thus, the straightway flow path has a similar cross-sectional area and geometry as a standard unlined manufactured valve. Maintaining the original dimensions not only provides similar flow characteristic as an unlined valve, but allows use of the same bore closure means from unlined valves.

Typically, the bore is machined to dimensions slightly larger than the outside dimensions of the liner to provide a thin annular space between the inner bore surface and the outer liner surface. For example, if the liner cross-section is circular, the outside diameter of the liner has a diameter slightly less than the inside diameter of the machined bore. The liner has a precisely dimensioned external surface to provide the thin, precise, substantially annular space between the external surface of the ceramic liner and the internal surface of the valve bore. This space is generally does not exceed about 0.02 inches (0.5 mm).

The liner is fixed to the inside wall of the bore by a thin bonding layer contained in the thin annular space between the outer surface of the liner and the inside surface of the bore. The bonding layer may be any bonding system wherein two surfaces are joined by an intermediate bonding layer. The bonding layer should preferably fill completely the thin annular space to prevent infiltration of fluid from the valve interior into the annular space. The bonding layer preferably has some flexibility to absorb thermal and mechanical stresses between the surfaces being bonded. Suitable materials for the bonding layer include those which are resistant to the environment to which the valve is to be exposed. Preferably the bonding layer has a high chemical resistance. In a preferred embodiment, a uncured material for the bonding layer is injected into the thin annular space and then cured. However, the uncured bonding-layer material, while being injectable, should also have a sufficiently high viscosity to remain in the annular space while being cured. A preferred bonding material is an adhesive which is preferably anaerobic, and produces no byproducts during curing which may interfere with formation of a continuous bond between the liner and the bore surfaces. Suitable adhesives include the epoxy resin illustrated below in the examples.

In a preferred embodiment of the invention, the bonding material is first coated upon the valve body surface. Either surface is then heated sufficiently to soften the material upon the surface. The ceramic liner and insert are inserted into the valve body, and the bonding material allowed to cool to bond the valve body to the ceramic liner and insert. The bonding material in this embodiment may be nay suitable thermoplastic material, but is preferably a fluorinated hydrocarbon polymer, such as polytetrafluoroethylene (PTFE), perfluoro(alkoxyalkane) copolymer (PFA), perfluoro(ethylene-propylene) copolymer (FEP), polyvinylidine fluoride (PVDF), ethylene-chlorotrifluoroethylene copolymer (ECTFE), ethylene-tetrafluoroethylene copolymer (ECTFE), ethylenetetrafluoroethylene copolymer (ETFE). Materials which can be electrostatically applied to the vale body are preferred, such as PFA and ETFE. In a preferred embodiment, the ceramic parts are allowed to fully cool after the fluorocarbon material is fused upon their surfaces. The valve body is coated and the fluorocarbon fused at an appropriate temperature, but before the valve body cools and the fluorocarbon is still in a plastic state, the ceramic parts are inserted. As the valve body then cools, it contracts around the ceramic parts to press the surfaces together and provide an improved bond. Optionally, a suspension of fluorocarbon powder may be injected between adjacent teflon coated ceramic and metallic surfaces and heated to fuse the powder and provide a bonding layer.

The ceramic liner has a sidewall opening sized and positioned relative to the bonnet opening so as to accommodate advancement of the bore closure means into the interior of the ceramic liner. In straight valves the sidewall opening is sized and positioned to accept the compressor-shaped diaphragm when the diaphragm is in a closed position.

The ceramic liner is made any ceramic with suitable physical and chemical properties. Preferably the ceramic liner is made from alumina or zirconia.

The valve of the invention preferably also comprises a bonnet ceramic insert sized and positioned to mate with the external surface of the liner and surround the sidewall opening. The insert extends from the sidewall opening to the bonnet opening of the valve body in order to cover at least a portion of the inner surface of the valve body defined by the bonnet opening. The purpose of the insert is to substantially prevent exposure of said inner bonnet opening surfaces to fluid in the bonnet opening. Preferably, the insert is made from the same ceramic material as the liner, and has a similar wall thickness as t he liner. The inner surface of the bonnet opening and the outer surface of the insert are dimensioned to proved a thin space between them, similar to the thin annular space between the liner the bore surfaces. Likewise the insert is bonded to the bonnet opening surface by an bonding layer, in the same manner the ceramic liner is bonded into the bore, preferably with the same bonding material. In addition the mating surfaces between the liner and the insert at the sidewall opening of the liner, are also bonded together by the same bonding material to prevent infiltration of fluid in the valve. It is preferred that the bonding material in the thin annular space between the valve body and the liner and insert be not exposed to materials flowing through the valve.

The insert is dimensioned to accommodate the closure means when the valve is closed, i.e. when the closure means is fully advanced into the interior of the liner such that there is a fluid seal between the surface of the closure means and the inner surfaces of the liner and the insert.

A preferred structural configuration of the sidewall opening in the liner can be described by the intersection of a right regular cone with the outer surface of the liner. The cone has an axis along the bonnet axis with its apex spaced away from the sidewall opening in the direction opposite the bonnet opening. When an insert is mated with this sidewall opening configuration, the inner surface of the insert is preferably defined by a portion the cone which also defines the sidewall opening. The portion is an irregular frustum, i.e. The truncated cone extending from the sidewall opening to a base plane which is perpendicular to the bonnet axis and is spaced from the sidewall opening in a direction away from the liner axis. Preferably the apex angle of the cone corresponds with the contour angle of the diaphragm when it is in the closed position, and typically 60° ±10°. The apex of the cone is at a point beyond the external surface of the sidewall of the liner and opposite the bonnet opening.

Ceramic lined valves are not only more resistant to corrosion and/or erosion than valve of the prior art, but are also essentially non-contaminating. Thus, these valve are ideal in corrosive and erosive environments. In addition, since the valve body is not ceramic, it is possible to avoid problems of structural integrity of valve with ceramic valve bodies. The valve liners and inserts of the invention have geometrical shapes which permit fabrication using conventional machining techniques, such as milling, lathe, cylindrical grinding, and surface grinding. While in the valve the valve liners and inserts are subject to little of both mechanical and thermal flexural stresses, since the liner and insert are separate components and are of a shape such that most stress is compressive. Accordingly the valves liners and inserts are much less fragile than more complex-shaped valve liners. In addition, the invention provides for a stronger, less fragile lining system since the liners and inserts of the invention can be readily manufactured from highstrength, high-purity ceramic materials.

DETAILED DESCRIPTION OF THE INVENTION

Figure 1:
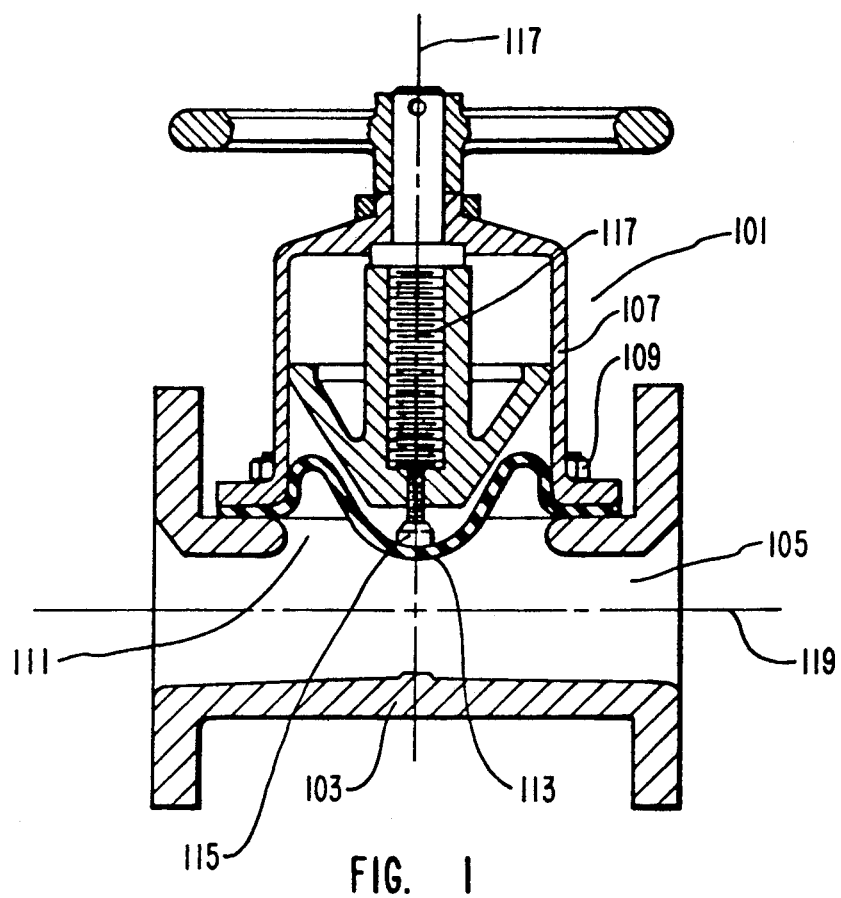
FIG. 1 is a sectional, elevational view of a conventional cast iron straightway diaphragm valve.

The liners and inserts of the instant invention are useful both with standard manufactured valves and with valves specifically made to accommodate a ceramic liner. For example, ceramic lined diaphragm valves may be papered from a standard cast iron valve by machining the bore of cast iron to obtain a larger internal diameter to accommodate a ceramic liner. Preferably, in this embodiment the internal diameter of the liner is substantially the same as the diameter of the original bore of the cast iron valves, i.e. the internal diameter of standard pipe, and the machining must remove a thickness of valve substantially equal to the thickness of the liner. The bore of the valve is generally machined to form a right cylinder, however, a tapered bore may be formed to receive a ceramic liner which has a tapered external surface and, preferably, an internal bore which is a right cylinder. The maximum taper useful for liners of this invention is about 15°, and preferably about 10°, included angle.

For valves specifically manufactured for ceramic liners, a specially structured metal valve may be manufactured which is cast with a larger-than-usual bore so that minimal machining is necessary to form a bore which accepts a ceramic liner having an external bore which is sized to be substantiality equal to connecting pipes. General, valves are denominated by the diameter of their bores, e.g., a two-inch valve is one which has a bore having a nominal diameter of two inches.

In addition, premanufactured valves may have a special cross-sectional shape of the valve bore, such as the valves described below with the non-circular D-shaped cross-section. Typically, as-manufactured conventional straightway valves have bores of a circular cross-section, and inserts of the general configuration of circular right cylinder may be used for these valves. A valve body may also be designed especially for use with ceramic inserts, in which case it may be desirable have a bore of a non-circular cross-section. Since valve are conventionally incorporated into piping systems with circular cross-section, it is preferable that ceramic lined valves with a non-circular cross-sectional also comprise ceramic transition rings in the bore on both ends of the ceramic insert. These end transition rings provide a smooth fluid flow transition between the circular pipe cross-section, and the non-circular cross-section of the ceramic lined valve bore. However, it also within the contemplation of the invention to have no transitional end rings, or to machine the ends of the liner to provide a transition. Where transition rings are used, the valve body is shaped to receive the transition rings. Transition rings can be bonded to the valve body in the same manner as the ceramic insert and liner, preferably using the same bonding system, with a bonding layer between adjacent surfaces of the transition rings and the ceramic liner as well as the adjacent surfaces of the end rings and the valve body.

The ceramic liner and ceramic insert are made by any suitable process for fabrication of high-purity, high-density ceramic shapes. Typically the ceramic liner and insert are produced by isostatically pressing a high-purity ceramic powder to form a suitable shape, a hollow cylinder for the liner, and a hollow cone for the insert. The shape is then sintered, and machined by conventional techniques to the final shape. The ceramic shape is preferably dimensioned, such that upon sintering, the external dimension is only slightly larger than the desired finished, precisely machined dimension. An appropriate ceramic powder is preferably one of alumina or zirconia, although other ceramic powders or mixed ceramic powders may be used. For alumina the powder should have at least about 95 wt.% purity, and for zirconia, about 90 wt.% purity. Zirconia and alumina are preferred as, both alumina and zirconia have good corrosion and abrasion resistance when sintered to a high density which is near the theoretical density (at least about 95% theoretical density). The external surface of the ceramic liner is machined to provide a liner which fits into the central bore of the valve such that the spacing between the external surface of the liner at an y point and the internal bore of the valve body does not exceed about 0.01 inches (0.25 mm) and is preferably not less than about 0.002 inches (0.05 mm) at any location. The liner is preferably a true right cylinder with a cross-sectional shape adapted to fit in the bore of the valve. The conical insert is preferably a conical shape as described below. Ceramic transition rings are preferably of the same ceramic material as the ceramic liner and insert and manufacture by the same process.

The ceramic liner and conical insert preferably have equivalent wall thicknesses. A preferred wall thickness of the liner is about 5 to 15% and preferably about 10% of the nominal or maximum internal diameter of the liner. Thus, a two-inch valve would preferably have a liner with a bore of about 2 inches (5 cm) in diameter with a wall thickness of about 0.2 inches (0.5 cm).

Preferably, the transition of the surface between the bore of the ceramic liner and the piping connected to t he valve is smooth. Where the bore-cross-section of the liner is circular the inner diameter of the ceramic liner preferably approximates the inner diameter of any pipe or conduit connected the valve body. Thus, the outer diameter of the ceramic liner should preferably exceed the inner diameter of any connecting pipe. Having the inner diameter of the liner and the inner diameter of connecting pipes substantially equal not only protects the bonding material from the corrosive/erosive effect of flowing fluids but it also avoids any shoulder being presented to the flowing fluid either at the entry or exit of the valves.

Where the bore-cross-section of the liner is non-circular, transition end rings may be provided for a smooth transition between a circular cross-section and a non-circular cross-section. It is preferred to provide separate transition rings rather than to incorporate a transition shape into the liner. A transition integral with the liner would be difficult to form by powder compression techniques usually required to form high density, high purity ceramic shapes. In addition, integral transition shapes with the liner would render it difficult or impossible to insert the liner in a conventional valve body without radial reconstruction of the valve body.

While it is preferred that the transition between the liner and the piping be smooth, it is also contemplated by the invention to provide for other configurations. For example, the liner may merely end at an abutment or shoulder if the diameter of the valve body bore is similar to that of the piping. In, addition, an transition ring between circular cross-section piping and a non-circular cross-section insert may take the form a circular disc with an aperture of the non-circular cross-section, such that the transition is in the form of an abutment.

In-service experience with cast iron valves has shown that the greatest wear occurs near the exit end of the valve. This may or may not be the case with ceramic lined valves inasmuch as the central bore or barrel of the liner is generally much smoother than the bore of a cast iron valve. The smoother bore may reduce eddies within the valve and thus may minimize any concentration of wear. If uneven wear occurs in ceramic lined valves, it may be advantageous to make the liner slightly thicker in the area of concentrated wear. The liner may be made with a tapered external surface as with a slightly tapered barrel. From experience with cast iron valves, it would be expected that the greatest wear would still occur near the valve exit. The thicker portion of the liner therefore would be near the valve exit. While diaphragm valves are typically reversible, a valve fitted with a tapered liner would then have a flow direction marked on the valve exterior so that the valve would be installed with the thicker portion of the liner adjacent the valve exit.

The instant invention may further be applicable to plug valves other than those with flexible diaphragms wherein the sidewall opening of the hollow ceramic liner and the lateral hollow ceramic insert are sized and structured to accommodate bore closure means which closes flow through the bore of the ceramic liner, and actuator means which actuates the bore closure means. It may also be necessary to provide a seal means at the upper part of the ceramic insert at the end away from the ceramic liner to prevent fluids from flow out of the bonnet section of the valve. In diaphragm valves, the seal means is provided by the flexible diaphragm. In plug valves, or the like, a separate seal means may be required.

The following examples are illustrative of the invention and are not intended to limit the scope of the invention.

EXAMPLE 1

This example illustrates the use of a ceramic liner and insert for a conventional straightway valve with a bore of circular cross-section.

FIG. 1 shows a cast iron straight-through diaphragm valve 101 of conventional type. The valve 101 has a valve body 103 with a central bore 105 or channel which passes straight through the valve body 103. Typically, in cast iron valves, the central bore 105 is not machined or, if machined, is a rough machined surface and is not of precise dimensions. A valve bonnet 107 is usually attached to the valve body 103 by bolts 109. The valve body has a bonnet opening 111 in its sidewall which connects with the central bore 105. A bore closure means in the form of a flexible, rubber-like diaphragm 113 is positioned between the bonnet 107 and the valve body 103 at the juncture of the bonnet and the valve body such that any fluids within the central bore 105 are prevented from flowing into the upper portion of the bonnet 107. The diaphragm 113 is fixed to a bore closure actuator means in the form of a compressor member 115 and a threaded screw 117. The compressor member 115 is actuated by the threaded screw 117 such that when the screw is rotated, the valve is opened and closed by advancing the diaphragm 113 into or retracting it from the central bore 105 of the valve body 103. Typically the axis of the compressor member 115 and the threaded screw 117 is perpendicular to the axis of the bore 119, such that the diaphragm 113 is advanced or retracted along a bonnet axis 121 perpendicular to the bore axis 119.

In order to prepare a conventional cast iron valve body, with bore of circular cross-section, for a ceramic liner of the instant invention, its central bore or channel is machined so that it becomes a cylinder with true circular cross-section of precise dimensions only very slightly larger than the external dimension of the sleeve or liner to be inserted. Also, the central bore is preferably machined to increase the diameter of the bore by an amount which is approximately twice the thickness of the ceramic sleeve or liner. Thus, the flow channel or bore of the ceramic sleeve has approximately the same diameter as the original bore of the valve body so that fluid flow from a connecting pipe is not constricted.

The ceramic liner is provided with an aperture or sidewall opening in one sidewall to allow the compressor and diaphragm to enter the bore of the ceramic liner and stop flow of fluid through the valve. The sidewall opening is located at about the longitudinal midpoint of the liner. The configuration of the sidewall opening is formed to conform to a surface generated by the intersection a cone with the surface of the liner. The cone axis is disposed at right angles to the axis of the liner, and is a 60° cone with the apex of the cone located at a point beyond the sidewall of the liner opposite the sidewall opening. The cone is preferably positioned so that the sidewall opening has a dimension longitudinally, that is, along the longitudinal axis or parallel to the longitudinal axis of the ceramic liner, which is about 1.5 to about 2.0 times greater than the internal diameter of the liner. The sidewall opening can be machined by locating the midpoint of the ceramic liner along its central longitudinal axis and then rotating the ceramic liner about a bonnet axis passing through said midpoint, with the bonnet axis perpendicular to the central longitudinal axis of the ceramic liner. A cutting tool is then directed at an angle of 30° to the bonnet axis.

The ceramic liner is fixed to the bore of the valve body by an bonding layer. The resin bond layer, as indicated hereinabove, is maintained very thin by imposing a tight tolerance between the external surface of the cylindrical ceramic liner and the internal cylindrical machined surface of the metal valve body. The bonding material may be applied in any manner, e.g. by coating the surfaces of the valve bore and/or the ceramic liner before insertion of the ceramic liner, or by injecting the bonding material through holes in the valve body into the thin annular space between an inserted liner and the valve body.

A second ceramic part, a ceramic insert, may be fitted to the cylindrical ceramic liner to offer a measure of protection to any exposed parts of the valve body which may be exposed because of the sidewall opening cut in the cylindrical ceramic liner. The inner surface of the ceramic insert is defined by a portion of a right regular cone having an included angle at the apex of about 60° plus or minus 10°, and preferably plus or minus 5°, and a circular base opening. The inner surface of the insert includes the irregular frustum portion of the cone formed by making a circular cut around an axis perpendicular to the cone's central axis, i.e., the axis which passes through a midpoint of the base and through the apex. The outer surface of the insert is preferably also conical, the insert having a uniform wall thickness, and is configured to mate with the inner valve body surfaces in the bonnet opening. As with the liner, a thin space is between the outer surface of the liner and the corresponding inner valve body surfaces. The circular cut has a diameter which is equal to the external diameter of the cylindrical ceramic liner, and the opening has a configuration defined by the intersection of the cone surface with the surface of the cylinder with an axis of the cut and a diameter of the circular cut. The conical insert is thus dimensioned such that it fits within the upper portion of the valve body and snugly against the external surface of the cylindrical liner and protects the internal surfaces of the valve body in the bonnet opening from corrosive fluids and from abrasive fluid/solid mixtures flowing through the central bore of the liner. The cone defining the inner surface of the insert preferably coincides with the cone defining the configuration of the sidewall opening in the ceramic liner when the insert and the liner are in place in the valve body.

Figure 2:
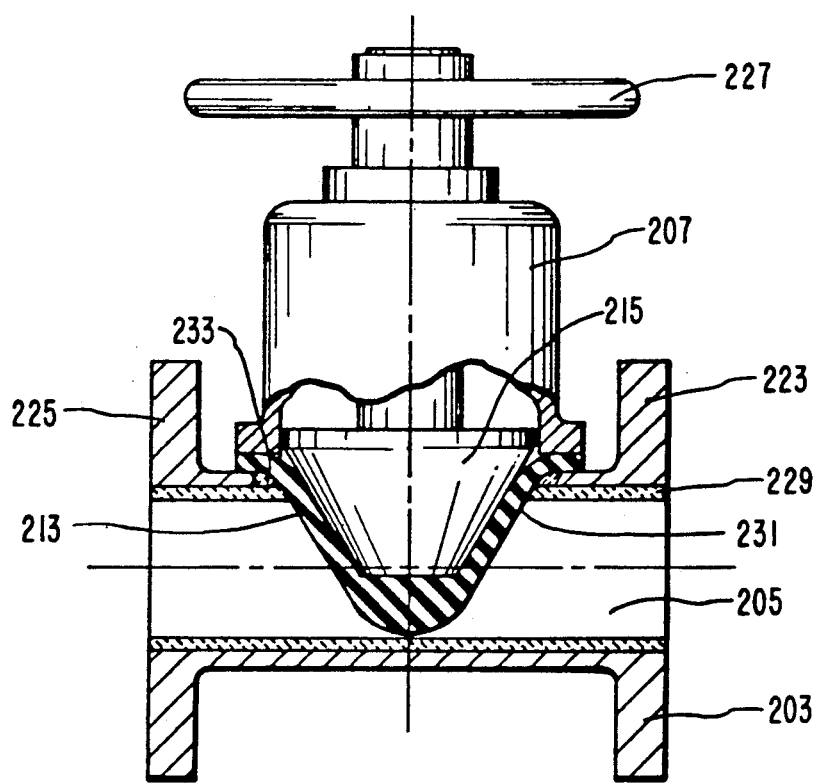
FIG. 2 is an elevational, side sectional, view of a metal straightway diaphragm valve having a cylindrical ceramic liner of the invention with a circular cross-section.

The structures of the ceramic liner and insert, as well as their placement in the valve, are illustrated in FIGS. 2 through 10. In FIG. 2, a straightway diaphragm metal valve body 203 and bonnet 207 is illustrated in an elevational, partial sectional view. The valve has a valve body 203 with a machined straight-through central bore 205 and a pair of end flanges 223, 225 for attachment to piping. The valve body 203 has affixed to it a bonnet 207 which houses a compressor member 215 which is actuated to advance and retract through a bonnet opening 211 by operation of hand wheel 227 and actuator means in the form of a threaded screw (not shown). A flexible diaphragm member 213 is fixed between the bonnet 207 the valve body 203 so that it extends and advances with movement of the compressor to close or open the fluid passageway through the bore.

The valve body 203 of FIG. 2 and its bonnet 207 are made of cast iron. The valve body has been machined precisely to open the bore to a greater diameter and also to form a precisely machined right cylinder with a circular cross-section which is only slightly larger than the external diameter of the ceramic liner 229. The internal diameter of the ceramic liner 229 or sleeve is approximately the same as the original internal diameter of the bore 203 of the cast iron valve body before machining, and has a sidewall opening 231 aligned with the bonnet opening 211 of the valve body 203 to accommodate advancement of the diaphragm 213. The hollow conical ceramic insert 233 rests in a saddle-like fashion upon the top surface of the sidewall opening 231, thereby covering and protecting internal valve body surfaces between the diaphragm 213 and the sidewall opening 231 of the liner 229.

Figure 3:
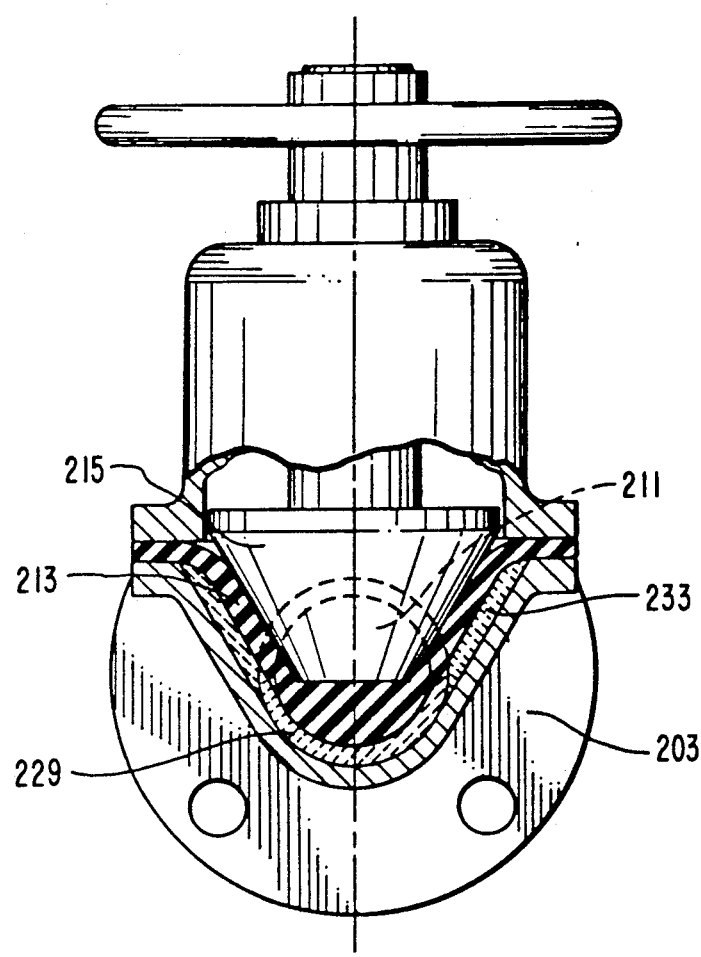
FIG. 3 is a partial, elevational, sectional end-on view of a metal straightway diaphragm valve having both a hollow cylindrical ceramic liner and a conical ceramic insert of the invention.

FIG. 3 is an partial, elevational, sectional end-on view of the metal straightway diaphragm valve having a hollow cylindrical ceramic liner and a conical ceramic insert shown in FIG. 2. The conical ceramic insert 233 is shown resting within the angular sidewalls of the bonnet opening 211 of valve body 203 with the lower edge of the insert resting against the outer sidewall of cylindrical ceramic liner 229. The diaphragm 213 is shown in an advanced or extended position with compressor member 215 in a lower position so that fluid flow through the valve is cut off.

Figure 4:
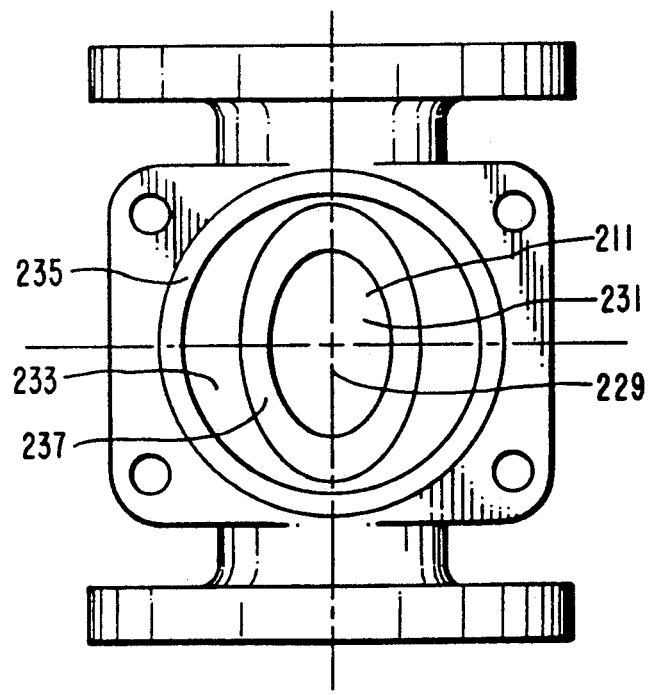
FIG. 4 is a plan view of the valve body metal straightway diaphragm valve in FIG. 3 illustrating a top view of the conical ceramic insert.

FIG. 4 is a plan view of the valve body, liner and insert of FIG. 2 illustrating a top view of the conical ceramic insert 233 looking through towards the bottom of the interior surface of ceramic liner 229. The bonnet, diaphragm and compressor have been removed in this figure so that the view is through the bonnet opening 211 in the valve body, i.e. The opening in which the conical insert 233 fits with the upper edge 235 of the conical insert visible. Sidewall opening 237 is in the ceramic liner 229 to admit the advancement of the diaphragm and compressor. Surface 237 defining the edges of the sidewall opening 237 is an angular cut surface in the cylindrical ceramic liner and is further illustrated in FIG. 5.

Figure 5:
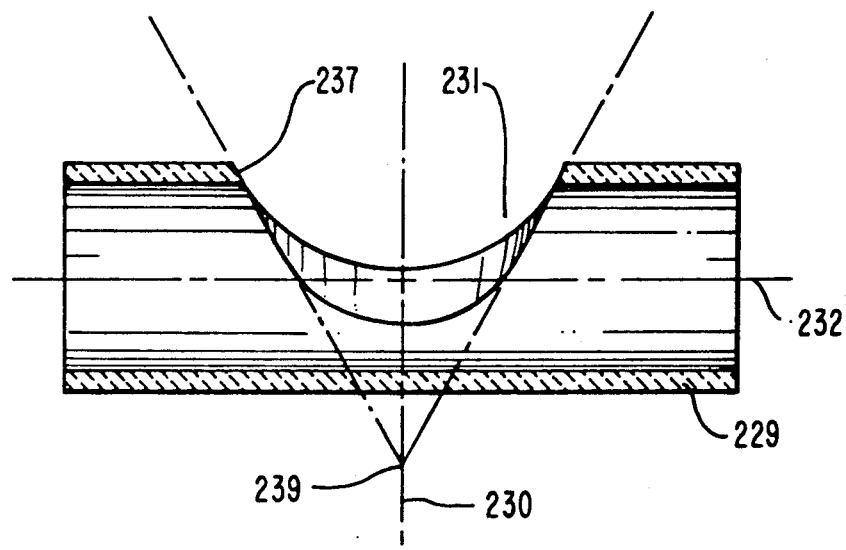
FIG. 5 is an elevational, sectional side view of a cylindrical ceramic liner of FIG. 4.

FIG. 5 is an elevational, sectional side view of the ceramic liner of FIG. 2. It shows the sidewall opening 231 cut in the top surface of the liner. As illustrated in FIG. 5, the side wall opening 231 is cut in the cylindrical liner 229 at an angle of about 30° from an axis 230 perpendicular to the axis 232 of the liner to form cut surface 237, which is a partial surface of a 60° cone. The angle of the cut to form surface 237 is such that at the sidewall opening 231 the cone apex 239 projects beyond the opposite sidewall of the ceramic liner 229. The cone apex 239 is approximately one diameter from the cylinder longitudinal center line or axis 232 of the cylindrical ceramic liner 229. The distance of the apex 239 from the longitudinal axis 232 of the ceramic liner may vary in distance slightly from the diameter of the cylindrical liner 229 although the apex 239 preferably always extends beyond the external surface of the valve liner 229 opposite the sidewall opening.

Figure 6:
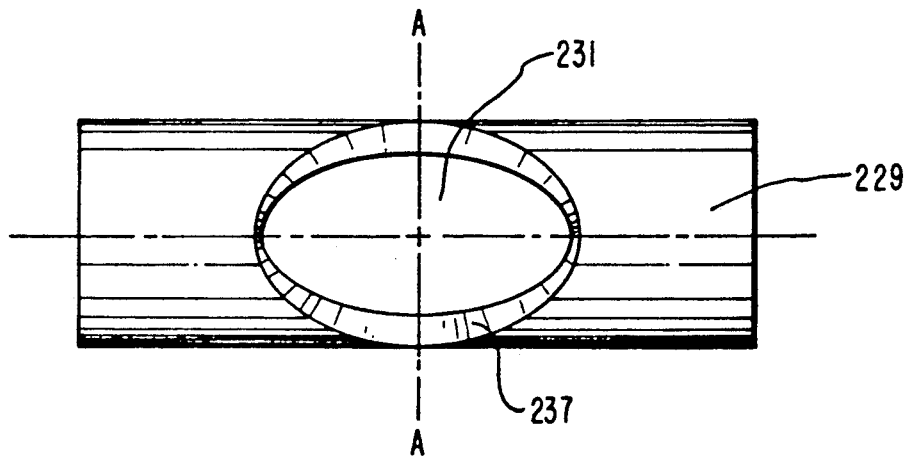
FIG. 6 is a plan view of the liner illustrated in FIG. 5.

FIG. 6 is a plan view of the ceramic liner 229 of FIG. 2 further illustrating the sidewall opening 231 and angular cut surface 237.

Figure 7:
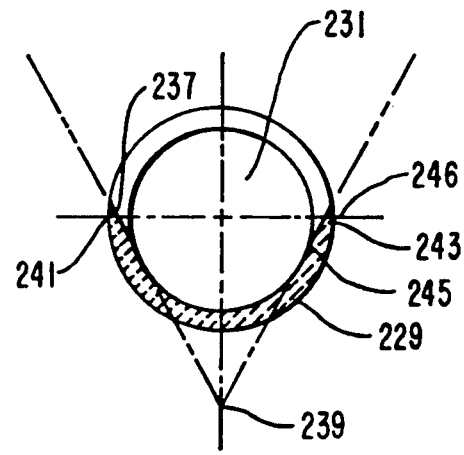
FIG. 7 is a sectional, elevational view along sectional ends A—A of FIG. 6.

FIG. 7 is a sectional, elevational view of the ceramic cylinder liner of FIG. 6 along section lines A—A of FIG. 6 so that the view is across the bore of the liner 229. The angular cut surface 237 of the sidewall opening 231 extends nearly across the entire diameter at the midsection of the liner, from one side point 241 of the liner to the opposite side point 243, which are approximately on a diameter of the liner 229. Referring to FIG. 5, which is a sectional view taken from the side, and the present FIG. 7, which is a sectional end view, the apex 239 of the cone is shown at the same position and the angular cut surface 237 is shown in FIG. 7 with the upward sloping surface of the cut extending at its lowest point 245 to slightly above the midpoint 246 of the liner 229.

Figure 8:
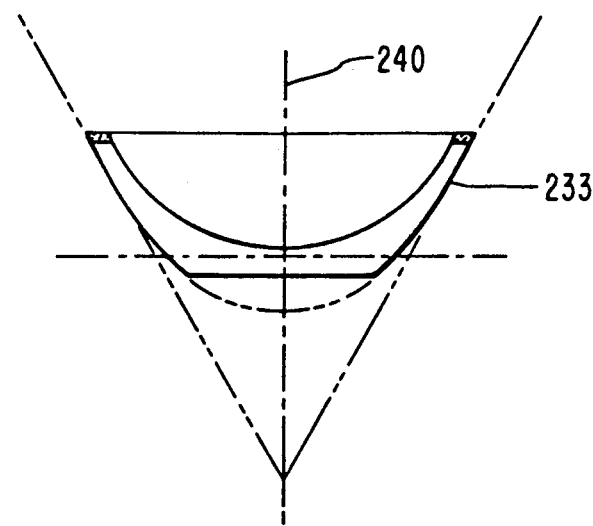
FIG. 8 is a partial sectional view of the conical ceramic insert along section lines B—B of FIG. 9.
Figure 9:
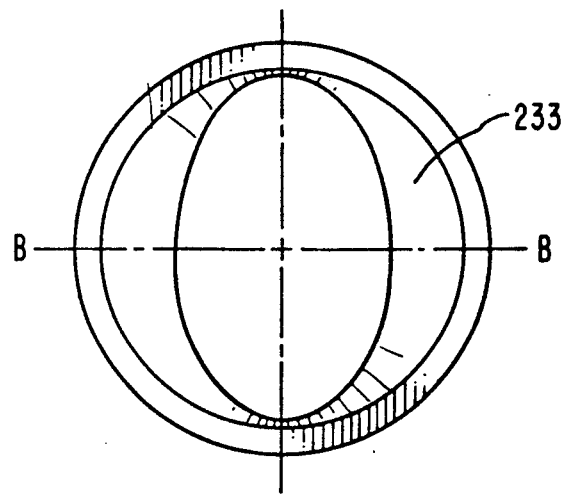
FIG. 9 is a plan, top view of the conical ceramic insert.
Figure 10:
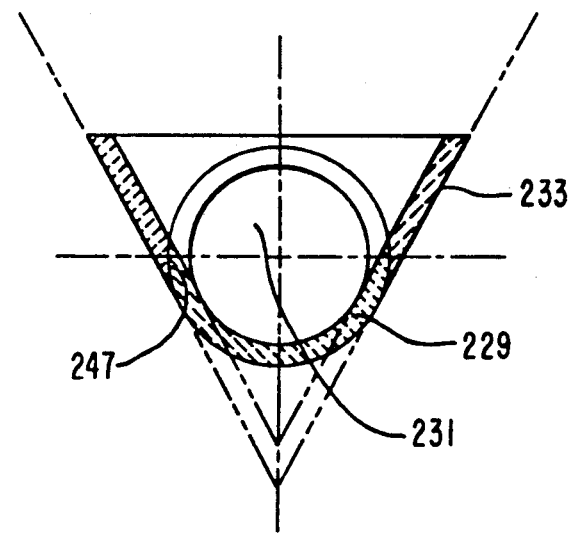
FIG. 10 is an elevational, sectional view of the ceramic conical insert along section lines 10—10 of FIG. 9.

FIGS. 8, 9, and 10 illustrate the ceramic insert of FIG. 2. FIGS. 8 and 10 are both sectional views, each at a rotation of 90° from one another. Thus, FIG. 8 may be termed a side view and is along section lines B—B of FIG. 9.

The conical insert 233 is formed by manufacturing a ceramic cone and then cutting through the cone a projected cylinder having a diameter of the ceramic liner. The cylinder is cut through the cone at right angles to the vertical axis 240 of the cone so that the insert will sit in saddle fashion upon the cylindrical ceramic liner 229 as illustrated in FIG. 10, which is a cross-sectional view of the insert 233 through section lines B—B of FIG. 9. Cut surface 247 of the insert 233 is the cut mates against the external surface of the cylindrical liner 229 over the sidewall opening 231. The manner in which the cone sits upon the liner is readily illustrated in FIG. 10 where the cut surface 247 is shown to have a semi-cylindrical portion.

The inner surface of the ceramic insert 233 is defined by a 60° cone corresponding to the cone defining the sidewall opening in the liner 229, when the insert is in place on the liner 229.

EXAMPLE 2

Figure 11:
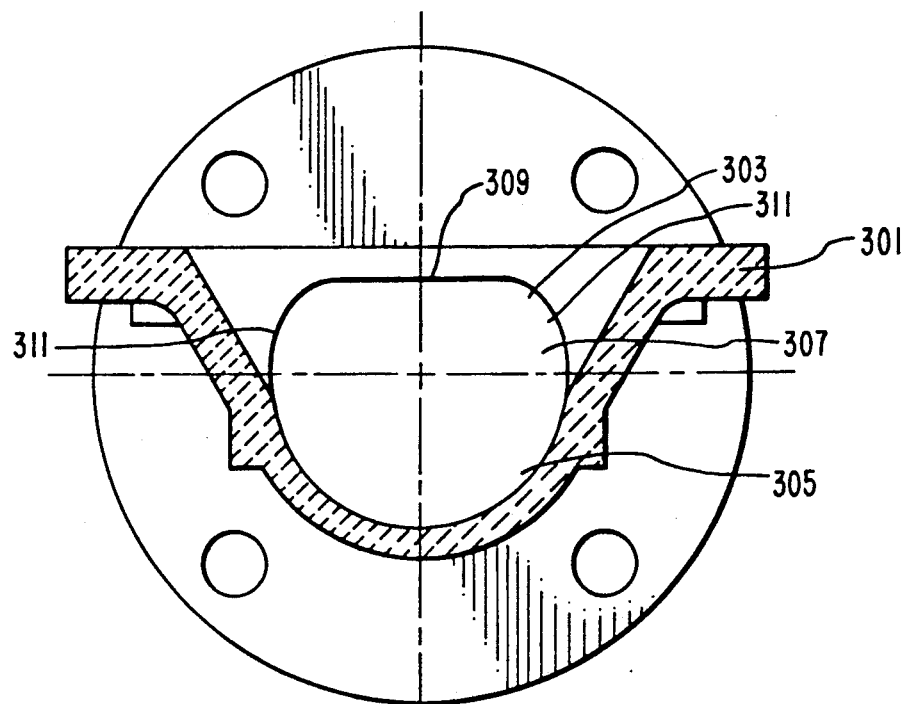
FIG. 11 is a cross-sectional view of cast iron straightway diaphragm valve body with a non-circular cross-section.

FIGS. 11 to 17 illustrate another embodiment of the invention wherein the bore of the valve body and ceramic liner are non-circular. In FIG. 11 is shown an end view of valve body 301 similar to that shown in FIG. 1 except the bore cross-section is not circular. The upper portion 303 is flattened to form a generally D-shape cross-section to shorten the distance the closure means has to travel into the bore to a sealed position. More particularly the cross-section comprises a lower portion 305 which is a semicircle, and an upper portion 307 comprising a horizontal line 309 and side curves 311 to smoothly merge the line into the lower semicircle 305.

The placement of the ceramic liner and insert are similar to that shown to the ceramic liner and insert shown in FIGS. 2, 3 and 4.

The structure of the ceramic liner and ceramic insert are illustration in FIGS. 12 to 17.

Figure 12:
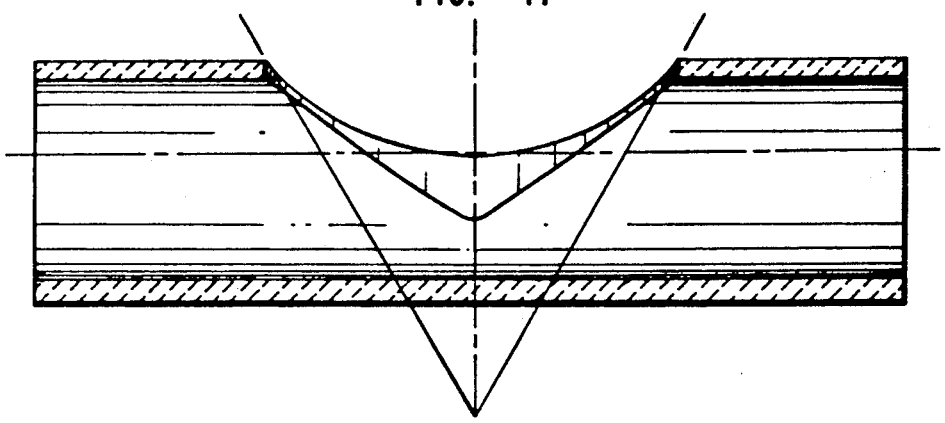
FIG. 12 is an elevational, sectional side view of a cylindrical ceramic liner for the valve body of FIG. 11.

FIG. 12 is an elevational, sectional side view of the ceramic liner 629 for the valve body of FIG. 11. It shows the sidewall opening 631 cut in the top surface of the liner. As illustrated in FIG. 12, the side wall opening 631 is cut in the cylindrical liner 629 at an angle of about 30° from an axis 630 perpendicular to the axis 632 of the liner 629 (corresponding to the center of the semicircular lower cross-section) to provide surface 637 as a partial surface of a 60° cone. The angle of the cut to form surface 637 is such that it the sidewall opening 631 the cone apex 639 projects beyond the opposite sidewall of the ceramic liner 629. The distance of the apex 639 from the longitudinal center line of the ceramic liner may vary in distance slightly from the diameter of the cylindrical liner 629 although the apex 639 preferably always extends beyond the external surface of the valve liner 629 opposite the sidewall opening.

Figure 13:
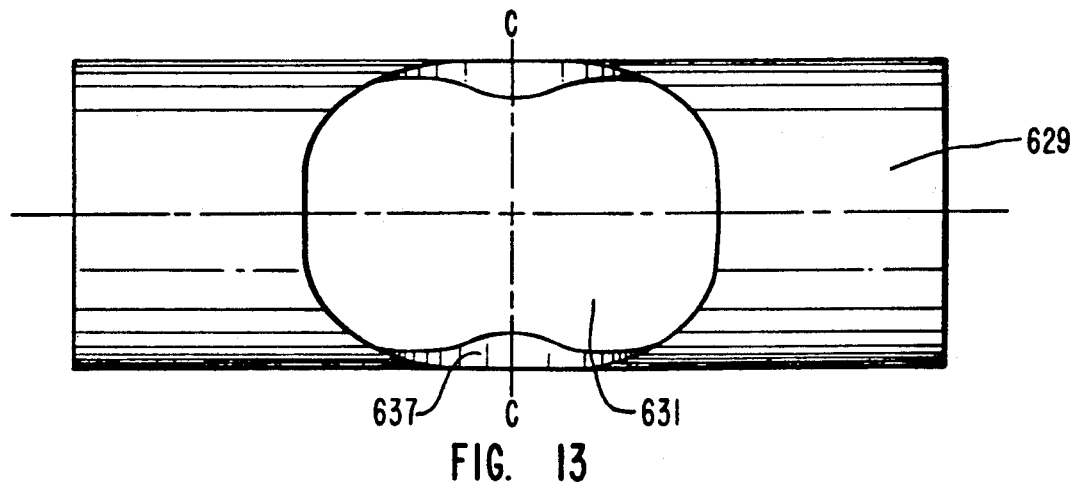
FIG. 13 is a plan view of the liner illustrated in FIG. 15.

FIG. 13 is a plan view of the ceramic liner of FIG. 12 further illustrating the sidewall opening 631 and angular surface 637.

Figure 14:
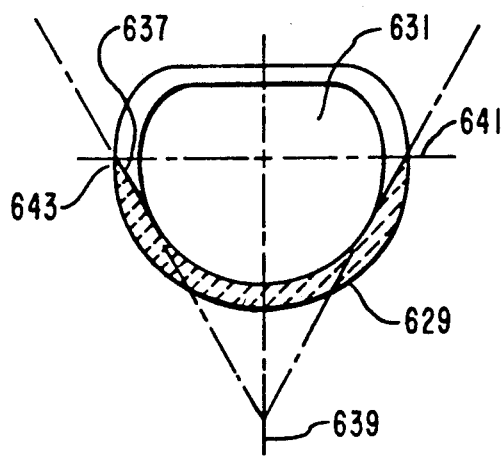
FIG. 14 is a sectional, elevational view along sectional ends C—C of FIG. 13.
Figure 16:
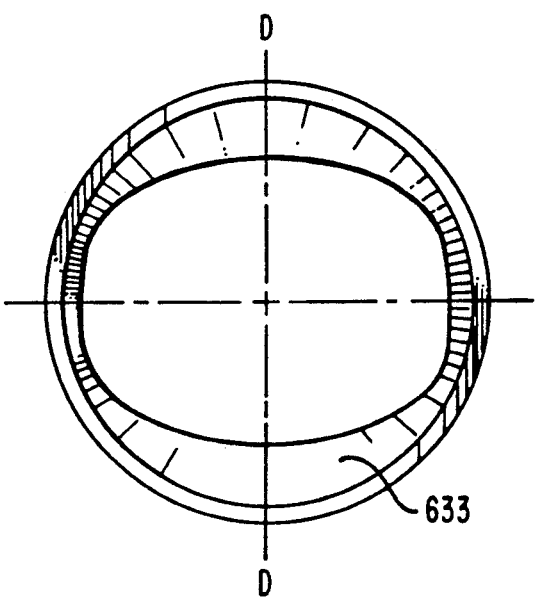
FIG. 16 is a plan, top view of the conical ceramic insert for the valve body of FIG. 11.

FIG. 14 is a sectional, elevational view of the ceramic cylinder liner of FIG. 13 along section lines C—C of FIG. 16 so that the view is across the bore of the liner 629. The angular cut surface 637 of the sidewall opening 631 extends nearly across the entire diameter at the midsection of the liner, from one side point 641 of t he liner to the opposite side point 643, which are approximately on the diameter of the lower semicircle of the liner 629. Referring to FIG. 12, which is a sectional view taken from the side, and the present FIG. 14, which is a sectional end view, the apex 639 of t he cone is shown at the same position and the angular cut surface 637 is shown in FIG. 14 with the upward sloping surface of the cut extending from its lowest point 645 to approximately the midpoint of the liner 629.

Figure 15:
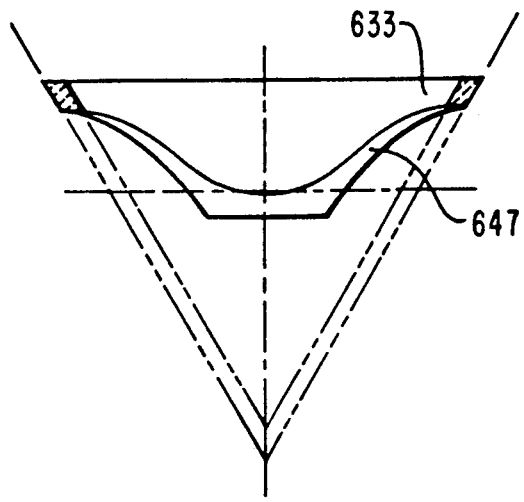
FIG. 15 is a partial sectional view of the conical ceramic insert along section lines 8—8 of FIG. 13.
Figure 17:
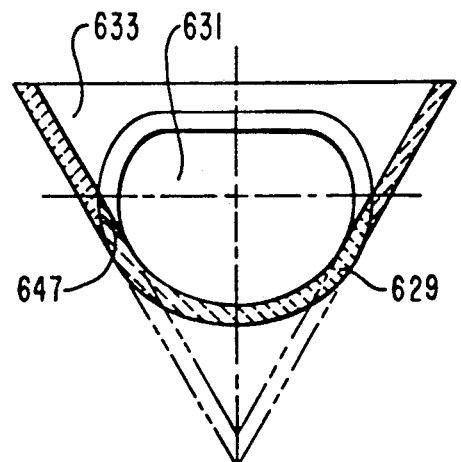
FIG. 17 is an elevational, sectional view of the ceramic conical insert along section lines D—D of FIG. 16.

FIGS. 15, 16, and 17 illustrate the ceramic insert to fit the valve body and ceramic liner of FIGS. 11 to 14. FIGS. 15 and 16 are both sectional views, each at a rotation of 90° from one another. Thus, FIG. 15 may be termed a side view and is along section lines D—D of FIG. 16.

The conical insert 633 is formed by manufacturing a ceramic cone and then cutting through the cone a projected cylinder having the outer dimensions and cross-section o the ceramic liner. The cylinder is cut through the cone at right angles to the vertical axis of the cone so that the insert will sit in saddle fashion upon the cylindrical ceramic liner 629 as illustrated in FIG. 17, which is a cross-sectional view of the inset 633 through section lines D—D of FIG. 16. Cut surface 647 of the insert 633 is the cut mates against the external surface of the cylindrical liner 629 over the sidewall opening 631. The manner in which the cone sits upon the liner is readily illustrated in FIG. 17 where the cut surface 647 is shown to have a portion corresponding to the outer surface of the liner 629.

The inner surface of the ceramic insert 633 is defined by a 60° cone corresponding to the cone defining the sidewall opening in the liner 629, when the insert is in place on the liner 629.

Figure 18:
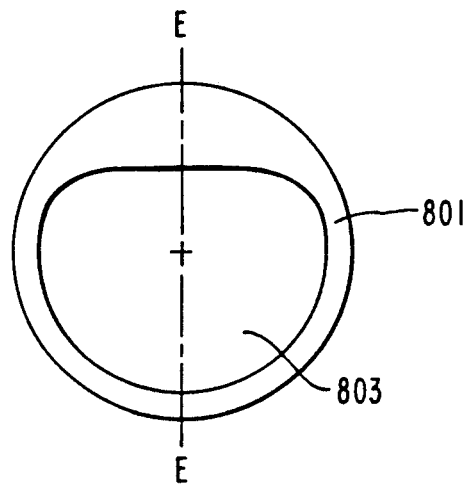
FIG. 18 is plan view of a transition ring of the invention.
Figure 19:
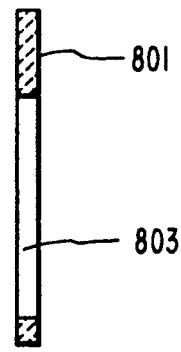
FIG. 19 is a cross-sectional view of the transition ring of FIG. 18.

FIGS. 18, 19, 20, and 21 show ceramic transition rings to provide a transition from the non-circular cross-section of the ceramic liner to the circular cross-section of the valve outlet and the piping attached to the valve. FIG. 18 is a plan view of a transition ring 801 in the form of a circular disc with a diameter corresponding to the inner diameter of the valve outlet and an aperture 803 corresponding to the cross-section of the bore or the ceramic liner. FIG. 19 is a sectional view of FIG. 18 through line E—E, showing the walls of the aperture 803 as essentially straight and parallel to the longitudinal axis of the valve. With these rings, the transition between the non-circular cross-section and the circular cross-section is in the form of an abutment.

Figure 20:
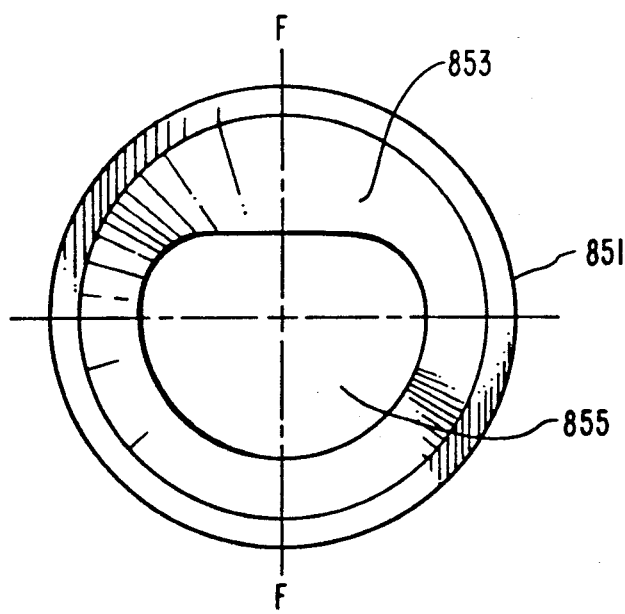
FIG. 20 is plan view of another transition ring of the invention.
Figure 21:
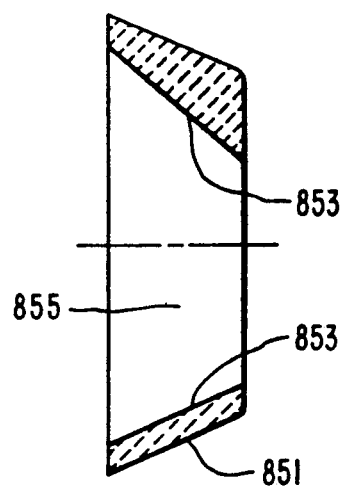
FIG. 21 is a cross-sectional view of the transition ring of FIG. 20.

FIG. 20 is a plan view of another transition ring and FIG. 21 is a sectional view through line F—F of FIG. 20. this transition ring 851 is thicker allowing a smooth transition 853 through the aperture 855 from the non-circular cross-section to the circular cross-section.

Figure 22:
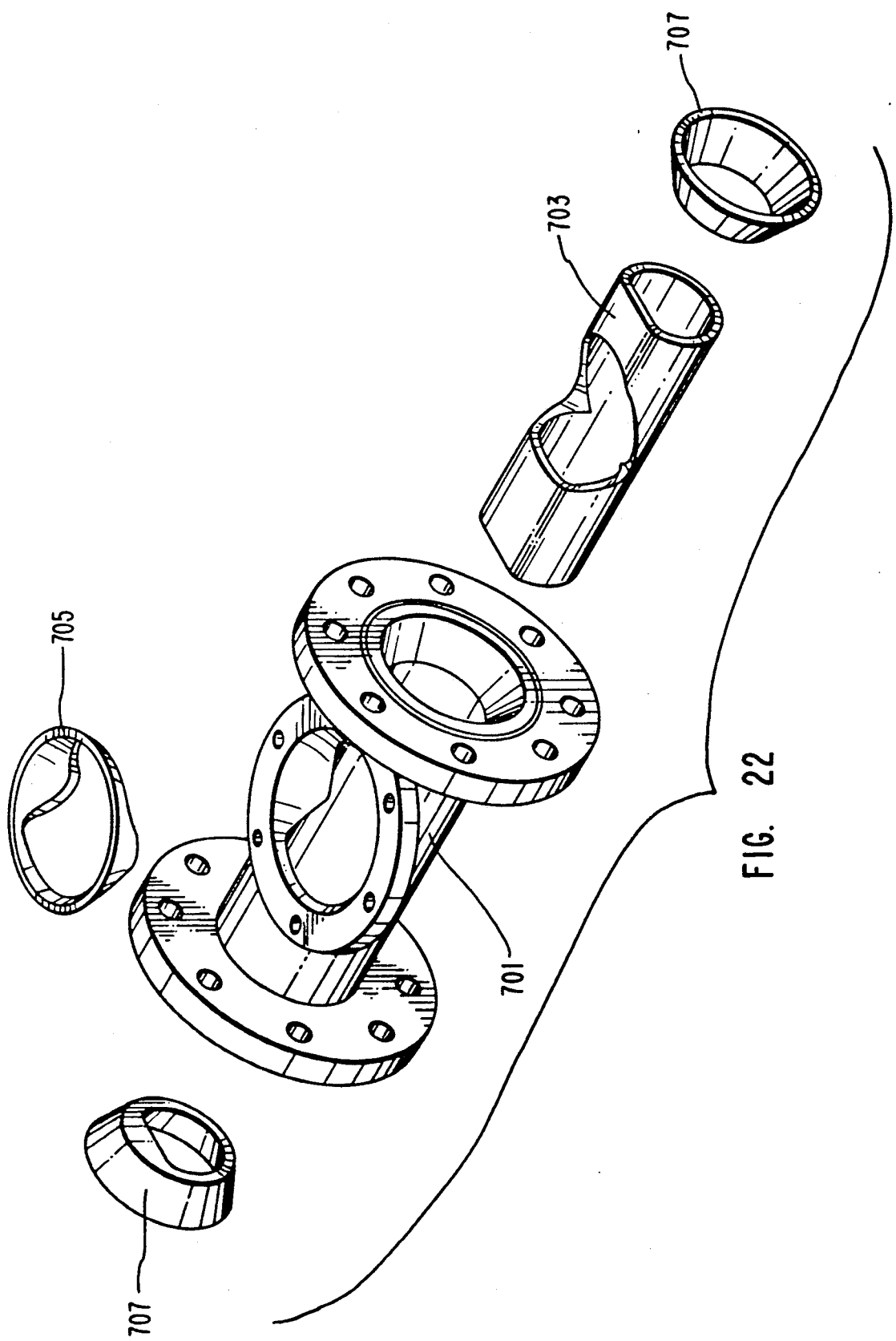
FIG. 22 is an exploded perspective view showing assembly of a valve of the invention comprising the transition rings as in FIG. 20.

FIG. 22 is an exploded perspective view showing assembly into a valve body 701 of a ceramic liner, a conical ceramic insert 705, and two transition rings. The valve body has a non-circular cross-section as in FIG. 11 cross-section an assembly of the valve body of FIG. 11, the ceramic liner of FIGS. 12 to 14, the ceramic insert of FIGS. 15 to 17, and two transition rings of FIGS. 20 to 21. The transition rings are inserted into the valve such that the non-circular end of the aperture corresponds with the non-circular bore of the ceramic liner.

EXAMPLE 3

This example illustrates the bonding of the ceramic liner and insert to the valve body using a two-part epoxy resin as the bonding material. The valve body is precisely machined to a dimension slightly larger than the outside dimensions of the liner and insert to provide a small space. The liner and insert are inserted and positioned within the valve body and the two components of the epoxy resin are mixed. The mixed resin is then injected through predrilled holes in the valve body into the space between the inner surface the valve body and the ceramic liner and insert. The epoxy is then allowed to cure in place. A suitable epoxy is available under the name of Master Bond Polymer System EP21AR, or Master Bond Polymer System EP21HTAR-1 by Master Bond, Inc., Hackensac, N.J. Another suitable epoxy is available under the name of "Brushable Ceramic" (no. 11760), from Devcon, Inc., Danvers, Mass.

EXAMPLE 4

This example illustrates the bonding of a ceramic liner and insert as in FIG. 1 or 2 using a fluorinated hydrocarbon with an adhesive for the bonding layer. The fluorinated hydrocarbon used was ETFE, available under the name of TEFZEL TM from DuPont.

The fluorinated hydrocabon is first applied to the valve body casting by sand blasting the casting to etch the surface, cleaning the surface. The valve body casting is then electrostatically sprayed with TEFZEL powder, and then fused at a temperature of about 330° C. The powder is sprayed in an amount to provide a fused layer of fluorocarbon with a thickness of about 3 to 10 mils S(0.08 to 0.3 mm), preferably 4 to 5 mils (0.1 to 0.13 mm). Mixed with the TEFZEL powder before spraying is a particulate epoxy resin which serves as an organic filler. After the fusion of the TEFZEL, the TEFZEL fluorocarbon encapsulated the organic filler within the layer, the organic filler existing as discrete particles in a matrix of the TEFZEL. However the surface of the TEFZEL layer is also modified to provide a more suitable surface for bonding to the ceramic as described below. The organic filler may be added in an amount between about 20 and 50 weight percent, preferably about 30 weight percent.

The surface of the fluorocarbon is then etched using a conventional etchant containing potassium or sodium salts. Alternately the surface may be mechanically abraded.

The ceramic liner and insert are then inserted and positioned within the valve body. Before insertion the outer surfaces of the ceramic liner and insert are coated with a two-part room curing adhesive, and after insertion the adhesive is allowed to cure in place. The adhesive is injected the joint between the ceramic insert and the ceramic liner in order to seal these joints and provide a smooth surface. Optionally the high-temperature curing adhesive may be used and the assembly of the ceramic liner/insert and valve body heated to cure the adhesive. The adhesive is preferably an anaerobic or two-part epoxy adhesive that forms no by-products upon curing. The adhesive should also have a high resistance to chemical corrosion. The viscosity of the adhesive should be low enough to allow insertion of the parts and injection of the adhesive, but should by high enough such that the adhesive does not flow from the small space between the ceramic parts and the valve body while it is curing. The adhesive preferably contains one or more coupling agents known in the art to enhance the bonding between organic and non-organic surfaces. These materials are often used for composites of a polymer matrix with an inorganic filler. Examples of suitable coupling agents are titanate, zirconate, and aluminate coupling agents, such as monoalkoxy, chelate, coordinate, quat, neoalkoxy, and cycloheteroatom titanate coupling agents. The coupling agent is typically added in amount of from about 2 to about 5, preferably about 2 weight percent. Examples of suitable adhesives are those in Example 3. Preferably, alumina powder is added to the adhesive (preferably from about 30 to 60 weight percent) as a filler. The alumina filler improves the abrasion resistance of the cured adhesive, as well as improves the uncured adhesive's ability to fill gaps and remain immobile during curing. Titania may also be added (from about 2 to 10 weight percent) to adjust color closer to the ceramic material.

The bonding system described in this example provides a bond between the valve body and the ceramic insert and liner which is highly resistant to chemical corrosion and failure of the bond. Since the high-purity, high-density ceramic materials used for the liner are essentially insert to chemical corrosion, in both caustic and acidic environments, the most vulnerable part of the assembled valve of the invention is the interface or bond between the ceramic and the valve body. If the bond fails, then fluids flowing through the valve may reach and corrode the metal of the valve body. By use of the above adhesive materials, a suitable bond is provided. However, the addition of the fluorocarbon layer provides further protection of the valve body from corrosion, in the event of failure of the adhesive of the bond. In order to insure that there is a bond over the entire exterior surface of t he ceramic liner and insert, it is necessary that the entire space between the exterior of the ceramic parts and the interior fluorocarbon lined surface of the valve body be filled with the adhesive before curing. In order to insure this, it may be necessary to inject the adhesive through holes in the valve body. Optionally, alumina powder may be added to the fluorocarbon to increase abrasion resistance, preferably in an amount between 15 and 85 weight percent.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A ceramic lined valve comprising:
   (a) a non-ceramic valve body having a substantially straight bore with the bore axis extending along the main axis of the valve body, and having a bonnet containing a bore closure actuator means attached to a bore closure means, which closure means can be actuated by the actuator means to advance the closure means into the bore through a bonnet opening extending into the bore from the bonnet; and
   (b) a ceramic liner positioned within the bore and coextensive with at least a portion of the inner surface of the valve body in the bore to substantially prevent exposure of said inner surface to fluids within the bore, said liner being cylindrical with a hollow interior and having a longitudinal axis substantially corresponding with the axis of the bore, said liner having a sidewall opening sized and positioned relative to the bonnet opening so as to accommodate advancement of said bore closure means into the interior of the ceramic liner.

2. The valve of claim 1 wherein the closure means advances along a bonnet axis which intersects and is substantially perpendicular to the liner axis.

3. The valve of claim 1 wherein the sidewall opening in the liner has a configuration described by the intersection of a right regular cone with the outer surface of the liner, the cone having an axis along the bonnet axis and its apex spaced away from the sidewall opening in the direction opposite the bonnet opening.

4. The valve of claim 3 wherein the cone is 60° ±10° and has its apex at a point beyond the external surface of the sidewall of the liner and opposite the bonnet opening.

5. The valve of claim 4 wherein said cone is a 60° ±5° cone.

6. The valve of claim 1 wherein said valve additionally comprises a bonnet ceramic insert sized and positioned to mate with the external surface of the liner and surround the sidewall opening, and also to extend from the sidewall opening into the bonnet opening, aid inset covering at least a portion of the inner surface of the valve body defined by the bonnet opening, so as to substantially prevent exposure of said inner bonnet opening surfaces to fluid in the bonnet opening.

7. The valve of claim 6 wherein said insert is dimensioned to accommodate the closure means when fully advanced into the interior of the liner, such that there is a fluid seal between the surface of the closure means and the inner surfaces of the liner and the insert.

8. The valve of claim 6 wherein the sidewall opening in the liner has a configuration described by the intersection of a right regular cone with the outer surface of the liner, the cone having an axis along the bonnet axis with its apex spaced away from the sidewall opening in the direction opposite the bonnet opening, and the configuration of t he insert is defined by a truncated portion the cone defining the sidewall opening, said truncated portion extending from the sidewall opening to a base plane perpendicular to the bonnet axis and spaced from the sidewall opening in a direction away from the liner axis.

9. The valve of claim 8 wherein the cone is 60° ±10° and has its apex at a point beyond the external surface of the sidewall of the liner and opposite the bonnet opening.

10. The valve of claim 9 wherein said cone is a 60° ±5° cone.

11. The valve of claim 8 wherein the valve body is metal, the closure means comprises a rubber-like diaphragm member fixed to the valve bonnet or valve body at the periphery of the bonnet opening, and the actuator means comprises a screw-actuated compressor member which extends the diaphragm member to a closed position by providing a fluid-tight seal between the surface of the diaphragm member and the surfaces of the liner and the insert and retracts the diaphragm member to an open position, the diaphragm member being fixed to said compressor near the center of the diaphragm.

12. The valve of claim 6 wherein the liner and insert have a similar wall thickness.

13. The valve of claim 1 wherein the valve body is metal, the closure means comprises a rubber-like diaphragm member fixed to the valve bonnet or valve body at the periphery of the bonnet opening, and the actuator means comprises a screw-actuated compressor member which extends the diaphragm member to a closed position by providing a fluid-tight seal between the surface of the diaphragm member and the surface of the liner and retracts the diaphragm member to an open position, the diaphragm member being fixed to said compressor near the center of the diaphragm.

14. The valve of claim 1 wherein said ceramic liner has a graded sidewall thickness.

15. The valve of claim 1 wherein the wall thickness of the liner is about 0.30 inches.

16. The valve of claim 1 wherein the bore has a dimension such that there is minimal spacing between the external surface of the liner and said inner surface of the valve body.

17. The valve of claim 16 wherein the liner is affixed to the valve body by an adhesive which is disposed in the spacing between the liner and the valve body.

18. The valve of claim 17 wherein said adhesive is an epoxy resin.

19. The valve of claim 18 wherein said epoxy resin is a cured, two-part epoxy resin having corrosion-resistant characteristics.

20. The valve of claim 1 wherein said spacing between said liner and said valve body bore does not exceed about 0.02 inches.

21. The valve of claim 16 wherein said spacing between said liner and aid valve body bore is substantially uniform.

22. The valve of claim 1 wherein said ceramic liner is affixed to said valve boy by an bonding layer intermediate the surface of the valve body and the surface ceramic liner.

23. The valve of claim 1 wherein said liner is a sintered alumina ceramic.

24. The valve of claim 23 wherein said sintered alumina ceramic has an alumina content of at least about 95% and a theoretical density of at least about 95%.

25. The valve of claim 1 wherein said liner is a sintered zirconia ceramic.

26. The valve of claim 25 wherein said zirconia ceramic has a zirconia content of at least about 90% and a theoretical density of at least about 95%.

27. The valve of claim 1 wherein the cross-section of the bore of the ceramic liner is non-circular.

28. The valve of claim 27 wherein the valve additionally comprises ceramic transition rings placed within the valve body at either end of the ceramic liner at the valve body inlet and outlet, the transition rings providing a transition between the non-circular cross-section of the ceramic liner and a circular cross-section of the valve inlet and valve outlet.

29. The valve of claim 28 wherein the transition between the non-circular cross-section to the circular cross-section is defined by a smooth line.

30. The valve of claim 28 wherein the transition between the non-circular cross-section to the circular cross-section is an abutment.

31. The valve of claim 27 wherein the cross-section of the bore is semicircular for the side of the liner opposite the sidewall opening and flattened on the side with the sidewall opening.

32. The valve of claim 1 wherein the ceramic liner is bonded to the valve body with a fluorocarbon polymer.

33. A method for bonding a ceramic surface to a metallic surface comprising;
(a) coating the metallic surface with a fluorocarbon polymer,
(b) coating the ceramic surface with a fluorocarbon polymer,
(c) heating at least one of the metallic or ceramic surfaces sufficiently to soften the fluorocarbon polymer,
(d) pressing the coated ceramic surface and the coated metallic surface adjacent to each other, and
(e) allowing the fluorocarbon to cool to fuse and form a bonding layer joining the metallic surface and the ceramic surface.

* * * * *